J. E. SPARLING.
SHAFT COUPLING.
APPLICATION FILED NOV. 28, 1919.
1,377,101. Patented May 3, 1921.
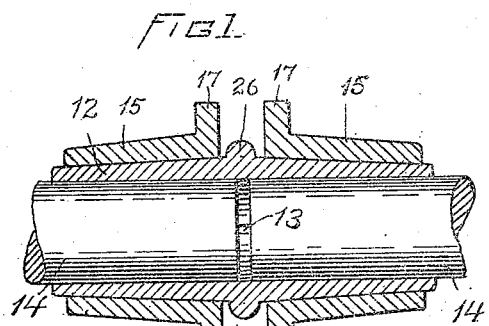
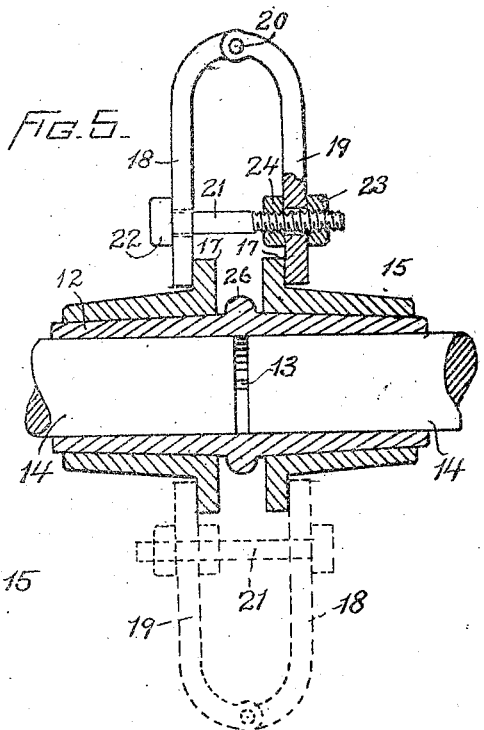
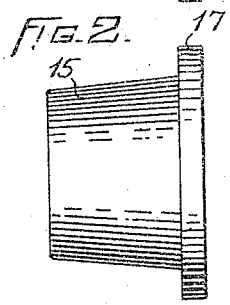
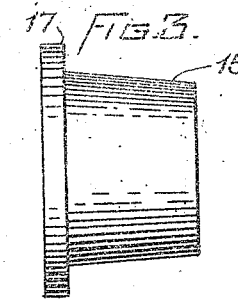
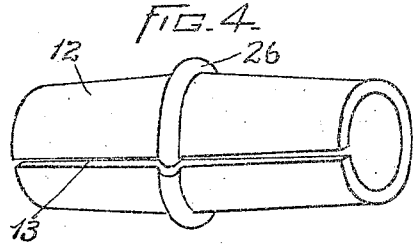
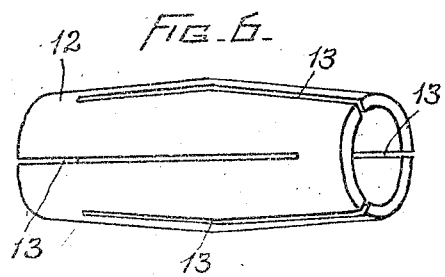
INVENTOR:
J. E. Sparling
ATTYS.

ially pierce sections to the ends of the same applied inven# UNITED STATES PATENT OFFICE.

JOHN ERNEST SPARLING, OF BOSTON, MASSACHUSETTS.

SHAFT-COUPLING.

1,377,101.  Specification of Letters Patent.  Patented May 3, 1921.

Application filed November 28, 1919. Serial No. 341,061.

*To all whom it may concern:*

Be it known that I, JOHN E. SPARLING, a subject of the Dominion of Canada, residing at Boston, in the county of Suffolk and State of Massachusetts, have invented new and useful Improvements in Shaft-Couplings, of which the following is a specification.

This invention has for its object to provide improved means of simple construction, for coupling together the ends of two shaft sections, and maintaining the same in alinement with each other, the coupling having a minimum number of parts and being operable by a vise removably applied to two of said parts to firmly connect the shaft sections.

Of the accompanying drawings forming a part of this specification,—

Figure 1 is a longitudinal section of a shaft coupling embodying the invention.

Figs. 2 and 3 are side views of the two collars shown by Fig. 1.

Fig. 4 is a perspective view of the sleeve, shown by Fig. 1.

Fig. 5 is a view similar to Fig. 1, showing a vise engaged with the flange of the collars.

Fig. 6 is a view similar to Fig. 4, showing a different arrangement of sleeve slots.

The same reference characters indicate the same parts in all of the figures.

In the drawings, 12 represents a compressible clamping sleeve, slotted longitudinally as indicated at 13, and adapted to receive the adjacent ends of two alined shaft members 14. The diameter of the sleeve is greatest at a point midway between its ends, and decreases from said point to the ends, so that the sleeve has two oppositely tapered peripheral portions. 15, 15 represent two duplicate collars having tapered bores conforming to the tapered portions of the sleeve.

The three parts above described constitute the entire coupling.

Each collar 15 is provided at its inner end with an outwardly projecting flange 17.

When the three parts of the coupling are assembled, the inner sides of the collar flanges are separated by an unobstructed space between the collars and their outer sides face in opposite directions, and are also unobstructed, so that they form bearings or abutments, on which the jaws of a portable vise may be removably seated to move the collars 15 simultaneously in opposite directions, and thus set up a strong frictional engagement between the collars and the sleeve 12, and at the same time compress the sleeve into frictional engagement with the shaft members 14.

Fig. 5 shows a vise composed of two lever jaws 18 and 19, hinged together at 20, and a bolt 21 passing loosely through the jaw 18 and having a head 22 bearing on the outer side of said jaw. The threaded portion of the bolt passes loosely through the jaw 19, and is provided with a clamping nut 23 bearing on the outer side of said jaw. On the bolt 21 is an internally threaded stop collar 24, adjustably engaged with the bolt thread. The vise may be first applied to the flanges 17 in the position shown by full lines. The nut 23 is then turned to force the jaws toward each other, the stop collar 24 having been previously adjusted inward or toward the head 22. When the vise jaws have been thus moved toward each other, as far as possible, the collar 24 is adjusted outward until it bears on the jaw 19. The clamping nut 23 is then loosened, and the vise is applied to the flanges in the position indicated by dotted lines. The clamping nut is then turned inward until the jaw 19 comes to a bearing on the collar 24, said collar being in position to arrest the closing movement of the jaws when they are at the same distance apart, as at the end of the first described operation of the vise. Provision is thus made for rendering the collars exactly coaxial with the sleeve and insuring uniform frictional contact between all portions of the internal surfaces of the collars, and all portions of the periphery of the sleeve embraced by the collars.

By applying a vise having lever jaws to the outer sides of the flanges 17, I am enabled to exert such force on the collars that the frictional engagement set up between them and the sleeve is inseparable by accident, and is separable only by resorting to severe methods, such as the driving, with great force, of a wedge between the inner faces of the collars.

Any other suitable form of vise may be employed, the unobstructed outer sides of the collar flanges 17 being adapted to engage vise jaws variously constructed and operated. The vise may be organized to force the collars to their operative positions by one operation instead of two. The vise is, of course, removed after its function has been performed.

It will be seen that by providing the duplicate collars having flanges with unobstructed inner and outer sides, I am enabled not only to utilize a vise as the means for making the coupling operative, but also to reduce the number of coupling parts to the minimum, by eliminating the connecting bolts and other devices heretofore employed as permanent parts of the coupling to connect the collars and force them toward each other.

Owing to the absence of connections between the collar flanges, the sleeve 12 constitutes the only torque-transmitting connection between the two shaft members. The midlength portion of the sleeve between the collars may be provided with a peripheral rib or enlargement 26, to aid in sustaining torsional strain.

The sleeve may have a plurality of slots 13 arranged as shown by Fig. 6.

It will be seen that the coupling sleeve 12 has a zone of maximum thickness midway between its ends, and tapered portions extending from said zone to its ends. It will also be seen that the collars 15 having tapered bores conforming to the said externally tapered portions, are elongated to extend from said zone substantially to the ends of said tapered portions, so that when the collars are moved simultaneously in opposite directions toward said zone, they directly exert uniform radial compressive pressure on said tapered portions, from the outer ends of the latter to said zone, and thereby maintain the entire bore of the coupling sleeve 12 parallel with the peripheries of the shaft sections 14. It will also be seen that the flanges 17 are adapted, by their location at the inner ends of the collars, not only to be engaged by the jaws 18 and 19 of a compact and conveniently applied vise, to impart compressive movements to the collars, but also to receive between their inner sides a compact or relatively narrow wedge adapted to displace the collars and permit the expansion of the sleeve. I am aware that it has heretofore been proposed to provide a shaft coupling composed of a split sleeve having oppositely tapered peripheral portions, and two relatively narrow rings formed to be driven on to the end portions only of the sleeve, to compress the latter upon shaft sections inserted therein, the said rings having no direct contact with the sleeve, excepting at the end portions of the latter.

The collars 15, elongated as described, and adapted to exert uniform compressive pressure on substantially all parts of the sleeve 12, enable the wall of the sleeve and the walls of the collars to be made much thinner, and to contain less metal, than would be necessary if the collars were relatively narrow rings, formed to embrace only the outer end portions of the sleeve, such rings exerting direct compressive pressure only on opposite end portions of the sleeve, so that unless the wall of the sleeve is made relatively thick and free from liability to be flexed by such pressure, the shaft sections will be gripped only by the end portions of the sleeve. Moreover, said rings are necessarily spaced apart much farther than are the flanges 17, so that a vise adapted to engage the rings and exert compressive pressure therethrough on the sleeve, and a wedge driven between the flanges to displace the rings, would necessarily be relatively bulky and unwieldly.

The peripheral strengthening rib 26, is formed on the above-mentioned zone of maximum thickness.

I claim:

1. A coupling for shaft members comprising a compressible slotted coupling sleeve, having a zone of maximum thickness midway between its ends, and externally tapered portions extending from said zone to its ends, and two duplicate independent sleeve-contracting collars, having tapered bores conforming to the said externally tapered portions, and elongated to extend from said zone substantially to the ends of said tapered portions, whereby, when said collars are moved simultaneously in opposite directions toward said zone, they exert direct uniform radial compressive pressure on said tapered portions, from the outer ends of the latter to said zone, thereby maintaining the entire bore of the coupling sleeve parallel with the peripheries of shaft sections inserted therein, the said collars being provided at their inner ends with flanges formed to be engaged by vise jaws, to impart sleeve-compressing movements to the collars, and separated by a relatively narrow space formed to receive a wedge adapted to displace the collars and permit the expansion of the sleeve.

2. A coupling substantially as specified by claim 1, the said zone being provided with a peripheral strengthening rib.

In testimony whereof I have affixed my signature.

JOHN ERNEST SPARLING.